United States Patent
Kränzle et al.

(10) Patent No.: US 8,777,260 B2
(45) Date of Patent: Jul. 15, 2014

(54) AIRBAG UNIT COMPRISING A HOLDING DEVICE FOR A TENSION ELEMENT

(75) Inventors: Armin Kränzle, Diessen (DE); Stephan Schellbronn, Tuntenhausen (DE)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 14/006,610

(22) PCT Filed: Mar. 28, 2012

(86) PCT No.: PCT/EP2012/001359
§ 371 (c)(1),
(2), (4) Date: Sep. 20, 2013

(87) PCT Pub. No.: WO2012/130445
PCT Pub. Date: Oct. 4, 2012

(65) Prior Publication Data
US 2014/0008901 A1    Jan. 9, 2014

(30) Foreign Application Priority Data

Mar. 29, 2011   (DE) .......................... 10 2011 015 309

(51) Int. Cl.
*B60R 21/20*    (2011.01)
*B60R 21/16*    (2006.01)

(52) U.S. Cl.
USPC ......... 280/740; 280/739; 280/741; 280/743.2

(58) Field of Classification Search
USPC ............................... 280/739, 740, 741, 743.2
See application file for complete search history.

(56) References Cited

U.S. PATENT DOCUMENTS 6,390,501 B1    5/2002  Greib et al.
6,918,614 B2 *  7/2005  Ryan .......................... 280/743.2
(Continued)

FOREIGN PATENT DOCUMENTS

| DE | 10 2007 032 763 A1 | 1/2008 |
| DE | 10 2007 029 392 A1 | 3/2008 |
| WO | WO 2007/065709 A1 | 6/2007 |
| WO | WO 2008/155954 A1 | 12/2008 |

OTHER PUBLICATIONS

German Examination Report—Feb. 20, 2012.
PCT International Search Report—Jun. 14, 2012.

*Primary Examiner* — Faye M Fleming
*Assistant Examiner* — Darlene P Condra
(74) *Attorney, Agent, or Firm* — Brinks Gilson & Lione

(57) ABSTRACT

An airbag unit with an airbag (10) encloses a gas compartment, an inflator, and a housing (20) containing the folded airbag. A holding device (40) having a first and a second section (42, 44) is provided, the first section (42) is connected to the housing (20), and the second section (44) can be detached from, the first section (42) upon an electrical signal. The holding device detachably fastens a tensioning element, whose first end is connected to the airbag, and its second end is connected to the housing (20) via the holding device (40) when the first and second sections (42 or 44) are connected. The holding device second section (44) is arranged inside the gas compartment, and a hole (13) is provided in the airbag (10), through which an ignition cable plug socket, an ignition lead (50) or the holding device first section (42) protrudes.

20 Claims, 5 Drawing Sheets

(56) References Cited

U.S. PATENT DOCUMENTS

| | | | |
|---|---|---|---|
| 6,932,384 B2* | 8/2005 | Waid et al. | 280/739 |
| 7,347,450 B2 | 3/2008 | Williams et al. | |
| 7,614,653 B2* | 11/2009 | Rose et al. | 280/739 |
| 7,614,654 B2 | 11/2009 | Williams | |
| 7,690,683 B2* | 4/2010 | Parks et al. | 280/743.2 |
| 7,722,080 B2 | 5/2010 | Rose et al. | |
| 7,762,584 B2* | 7/2010 | Morita et al. | 280/739 |
| 2002/0125706 A1* | 9/2002 | Greib et al. | 280/743.2 |
| 2005/0098990 A1* | 5/2005 | Pinsenschaum et al. | 280/739 |
| 2006/0071461 A1 | 4/2006 | Williams et al. | |
| 2007/0228710 A1 | 10/2007 | Ishiguro et al. | |
| 2009/0301339 A1* | 12/2009 | Ito et al. | 102/531 |
| 2010/0090445 A1* | 4/2010 | Williams et al. | 280/728.2 |
| 2010/0090450 A1* | 4/2010 | Webber | 280/736 |
| 2011/0309605 A1* | 12/2011 | Kumagai | 280/741 |
| 2012/0242069 A1* | 9/2012 | Parks et al. | 280/743.2 |

* cited by examiner

AIRBAG UNIT COMPRISING A HOLDING DEVICE FOR A TENSION ELEMENT

CROSS REFERENCE TO RELATED APPLICATIONS

This application claims priority to German Patent Application No. 10 2011 015 309.8 filed Mar. 29, 2011 and PCT/EP2012/001359, filed Mar. 28, 2012.

FIELD OF THE INVENTION

The invention relates to an automotive airbag unit with a holding device for a tensioning element.

BACKGROUND

In order to adapt an airbag, in particular a frontal airbag, to a specific accident situation and/or to the size/weight of the passenger to be protected, it has been known to provide a tensioning element, whose first end is connected to the airbag and its second end to a holding device, wherein the connection between the second end of the tensioning element and the holding device detaches upon receipt of an external signal, so that the properties of the airbag can be influenced through it. Such a tensioning element can, in particular, be used to open or close a ventilation opening in the airbag when holding devices are actuated, or to influence the expansion of the airbag.

PRIOR ART

For this purpose, a holding device having two sections is known from WO2007/065709A1, wherein the first section is permanently connected to the gas generator of the airbag unit, and wherein the second section can be split off the first section by means of a pyrotechnic squib located inside the holding device, as a result of which the end of the tensioning element is released. This holding device is located on the bottom of the gas generator facing away from the airbag, i.e. outside the airbag.

The category-defining U.S. Pat. No. 6,390,501 B1 shows such a holding device that is connected to the housing of the passenger airbag and protrudes into the housing. The lower edge of the airbag is connected to a lateral wall of the housing, so that the gas compartment encompassed by the airbag and the inner side of the housing are connected to one another. In this way, the tensioning element can extend from the second section of the holding device up to the gas compartment enclosed by the airbag without deflection or the like.

The same is seen in US 2010/0090450 A.

SUMMARY OF THE INVENTION

The object of the present invention is to improve a generic airbag unit such that it requires less installation space, and that it can, in particular, also be configured as a driver airbag unit arranged in a steering wheel.

This object is attained by means of the characteristics described herein.

According to the present invention, the holding device is located inside the airbag, i.e. inside the gas compartment enclosed by the fabric material forming the airbag. With this measure it is possible to transfer the advantages, as described by way of example in U.S. Pat. No. 6,390,501 B1, to very compact airbag units as well, in particular to driver airbag units, in which the gas generator used as an inflator unit protrudes into the gas compartment enclosed by the airbag. In order to allow for the positioning of the holding device according to the present invention, the airbag has a hole through which a electrical connection socket, an ignition lead, or the first section of the holding device protrudes.

In one preferred embodiment, the airbag is held on the bottom of the housing by means of a holding element or a holding and deflector element, wherein a section of the airbag is held between a bottom of this holding element or holding and deflector element and the bottom of the housing. In this case, the bottom of the holding element or of the holding and deflector element, and of the bottom of the housing have a perforation each which is aligned with the hole of the airbag. Here, the holding device is preferentially fastened to the holding element or to the holding and deflector element.

Preferred embodiments of the invention will be apparent from the exemplary embodiments explained in more detail with reference to the figures.

DESCRIPTION OF PREFERRED EMBODIMENTS

Figure 1:
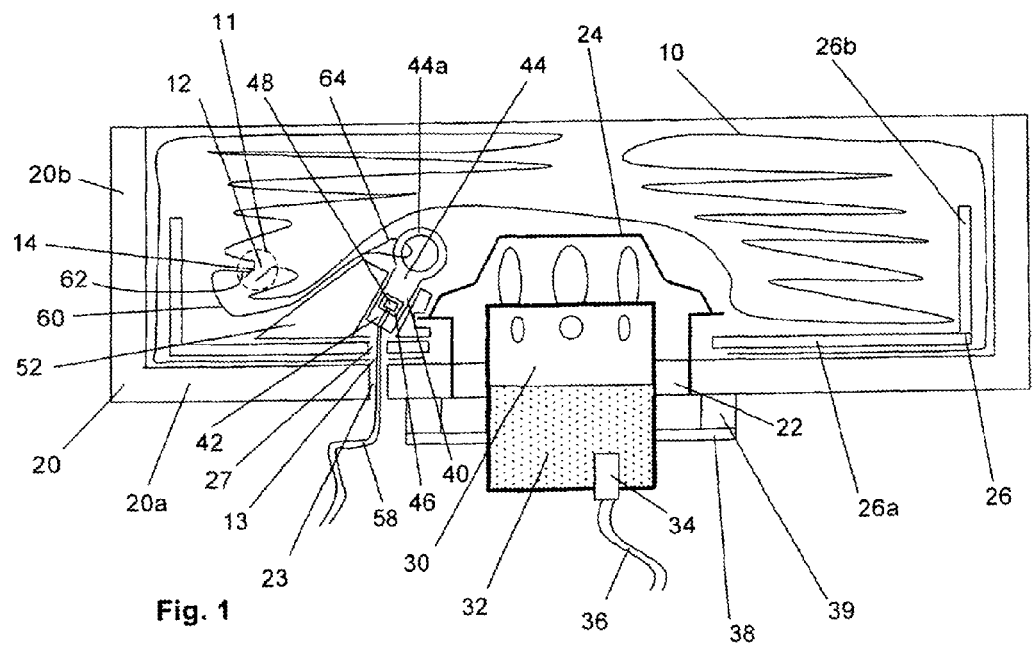
FIG. 1 is a schematic cross-section of a first exemplary embodiment of an airbag unit according to the present invention.
Figure 2:
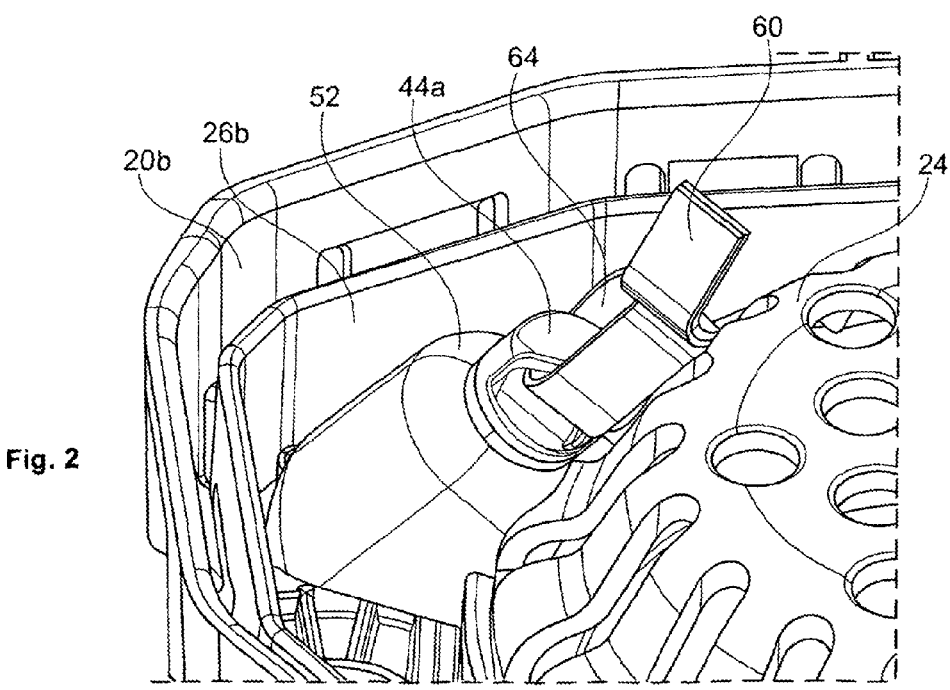
FIG. 2 is a partial three-dimensional view of airbag unit in perspective which is very similar to that in FIG. 1.

FIG. 1 shows a schematic cross-section of an airbag unit intended to be installed in the hub of a steering wheel. This airbag unit has a housing 20 with a housing bottom 20a and a peripheral housing wall 20b. The covering element (cover) with which the housing is closed is not shown. There is an opening 22 in the housing bottom 20a through which an inflator used as gas generator 30 protrudes into the housing 20. In the embodiment shown, the gas generator 30 is also used as damping mass to reduce the steering wheel vibrations, for which reason the gas generator is connected via its gas generator flange to the housing bottom 20a by means of elastic damping elements 39. In part to prevent the airbag which is folded in the housing 20 from being damaged by the vibrating gas generator 30, the gas generator 30 is covered by a diffuser 24. A first pyrotechnic squib (or initiator) 34 is used in the standard manner for the ignition of the propelling charge 32 located inside the gas generator 30, where the squib can be connected via an ignition cable 36 of the gas generator to a control device which is not shown.

In this embodiment, the airbag 10 is folded in the housing 20 and is formed of suitable fabric material which encloses the gas compartment and a ventilation system 11 consisting of a ventilation opening 12 and a nozzle 14 that is connected to the airbag 10, which is sewn around this ventilation opening 12. The first end of a tensioning strap 60 used as a tensioning element extends around the border of the nozzle 14 facing away from the airbag 10 in such a manner that the nozzle 14 is tightened when the tensioning strap 60 is under tension upon full deployment of the airbag 10 so that the ventilation system is closed or at least throttled. Such ventilation systems are described in detail in US 2006/0071461 A1, which is hereby referred to, so that the exact configuration of this ventilation system need not be described in more detail. The second end 64, which is configured as a sling, is connected to a holding ring 44a of a second section 44 of a holding device 40, which will be referred to in more detail later. The gas generator 20 protrudes through the inflation opening of the airbag 10 into the gas compartment enclosed by the airbag.

The bottom 26a of a holding and deflector element 26 is held at the housing bottom 20a. Apart from the bottom 26a, this holding and deflector element 26 has a lateral wall 26b essentially extending vertically to the bottom and parallel to the housing wall 20b. A lower section of the airbag 10 is located between the bottom 26a of the holding and deflector element 26 and the housing bottom 20a, and is thus held at the housing 20. Bolts extending from the bottom 26a of the holding and deflector element 26 through corresponding holes in the airbag 10 and through perforations in the housing bottom 20a which can be provided in order to hold together the holding and deflector element 26, the lower section of the airbag 10 and the housing 20. This is not shown here. The bottom of the holding and deflector element 26 has, as well as the housing bottom 20a, an opening 22 through which the gas generator 30 extends. In exemplary embodiments in which a deflector is not necessary, a mere holding element can be provided instead of the holding and deflector element 26 which corresponds to the bottom 26a of the holding and deflector element. Such a holding element thus virtually exclusively consists of its bottom.

In another embodiment, the gas generator 30 is entirely arranged in the interior of the airbag 10 and with its flange clamps the border of the inflation opening of the airbag between itself and the housing bottom, so that a separate holding element is dispensed with.

A holding device 40 is provided for the tensioning strap 60 which is essentially configured as the holding device in the category-defining WO 2007/065709 A1. This means that this holding device 40 is cylindrical in section and has a first section 42 and a second section 44, wherein a cavity 46 is placed in the holding device 40 which defines the border between the first section 42 and the second section 44. There is a second squib 48 in this cavity 46 which can be ignited via the ignition lead 58 of the holding device. If the second squib 48 is ignited, the holding device 40 will break and the second section 44 will separate from the first section 42. It should be emphasized here that other methods for separating the first from the second sections are possible, in particular such methods by means of which the holding device does not break. The only important thing is that the second section 44 loses its firm connection to the housing following the electrical signal. The second section 44 has the already mentioned holding ring 44a.

The first section 44 is held in a casing 52, wherein the first section 42 is firmly connected, for example screwed or glued, to this casing 52. The second section 44 can likewise extend into this casing 52, but is only connected to the first section 42 of the holding device 40, not to the casing 42. In the embodiment depicted this casing 52 is clipped onto the border of the diffuser 24 and can extend adjacent to this diffuser 24 in sections. In addition, the casing 52 can be connected, for example riveted, to the bottom 26a of the deflector element 26 (not shown). The first section 42 of the holding device is thus indirectly but permanently connected to the housing 20. The ignition lead 58 of the holding device which is connected to the second squib 48 extends through a perforation 27 in the bottom 26a of the holding and deflector element 26 (in case a pure holding element is provided, through its bottom), through a hole 13 in the airbag 10, and through a perforation 23 in the housing bottom 20a. The perforations 27 in the bottom 26a of the holding and deflector element 26, the hole 13 and the perforation 23 in the housing bottom 20a lie on top of one another and provide a pathway to the interior gas compartment of airbag 10. It would also be possible that the perforation (opening) 22 in the bottom of the holding and deflector element 26 through which the gas generator 30 passes is connected to the opening of the holding and deflector element, and/or that the hole 13 in the airbag 10 is connected to the inflation opening of the airbag 10, and/or that the perforation 23 in the housing bottom 20a is connected to the gas generator opening 22 in the housing bottom. The hole 13 and both perforations 23 and 27 may be separate openings, as is in fact shown.

In the embodiment shown, the holding device 40 is located entirely inside the airbag, i.e. inside the gas compartment and entirely inside the housing 20. In another embodiment, it would, however, also be possible that the first section 42 of the holding device emerges from the housing bottom 20a or is directly adjacent to it, so that an ignition lead socket can be attached to this first section 42. In this case, the first section 42 protrudes through the perforation 27 in the bottom 26a of the holding and deflector element 26, through the hole 13 in the airbag 10, and through the perforation 23 in the housing bottom 20a.

The region of the holding device 40 where the squib 48 is located lies inside the casing 52 and is protected by it, so that there is no possibility that the squib 48 is accidentally ignited by hot gases escaping from the gas generator 30.

Figure 3:
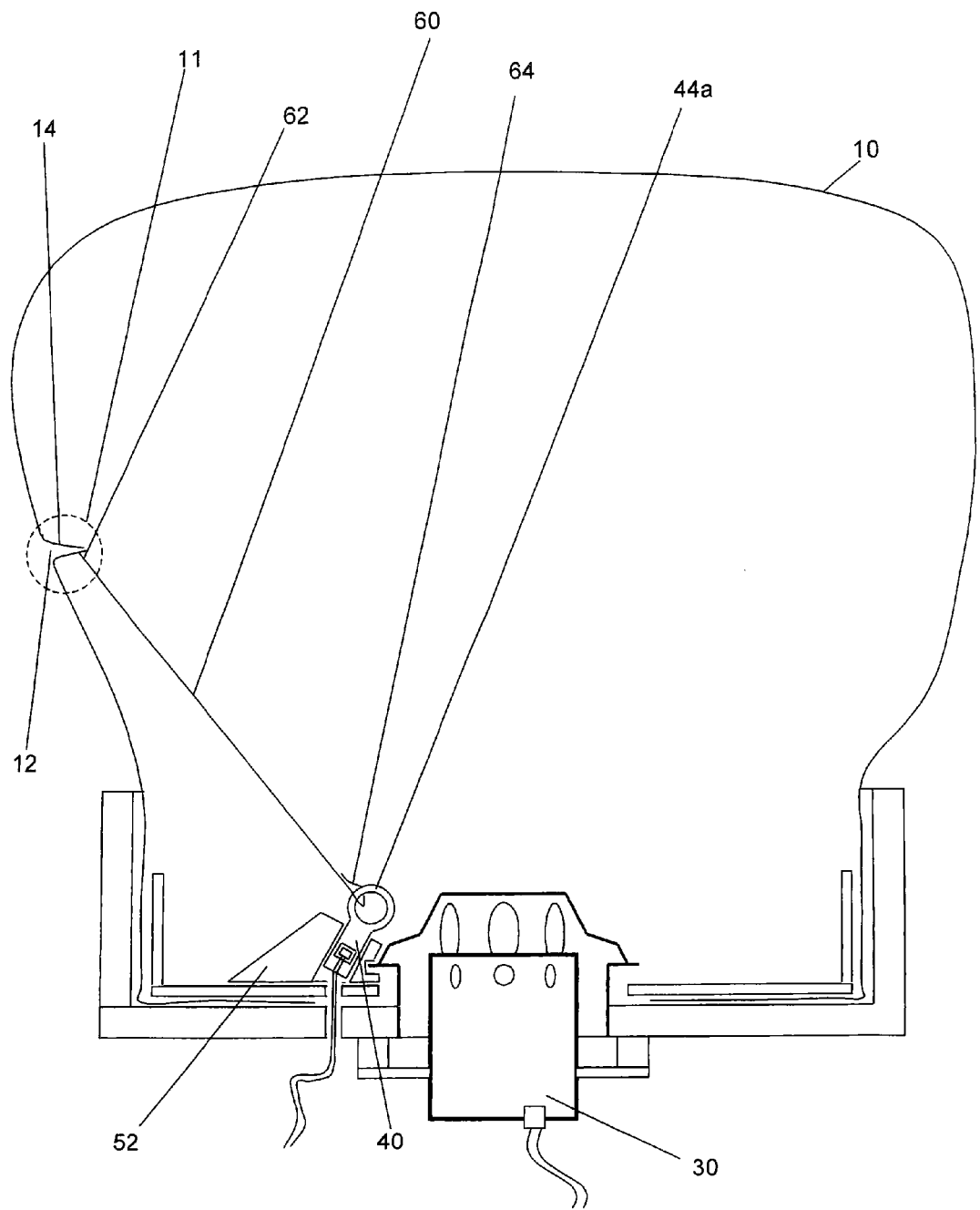
FIG. 3 shows the airbag unit from FIG. 1 with the expanded airbag.

FIG. 3 shows the situation in which the airbag 10 has become fully unfolded after the ignition of the gas generator 20, but without the holding device 40 having been actuated. In this case, the tensioning strap 60 is under tension, as a result of which the nozzle 14 is tightened and the ventilation system 11 is closed.

Figure 4:
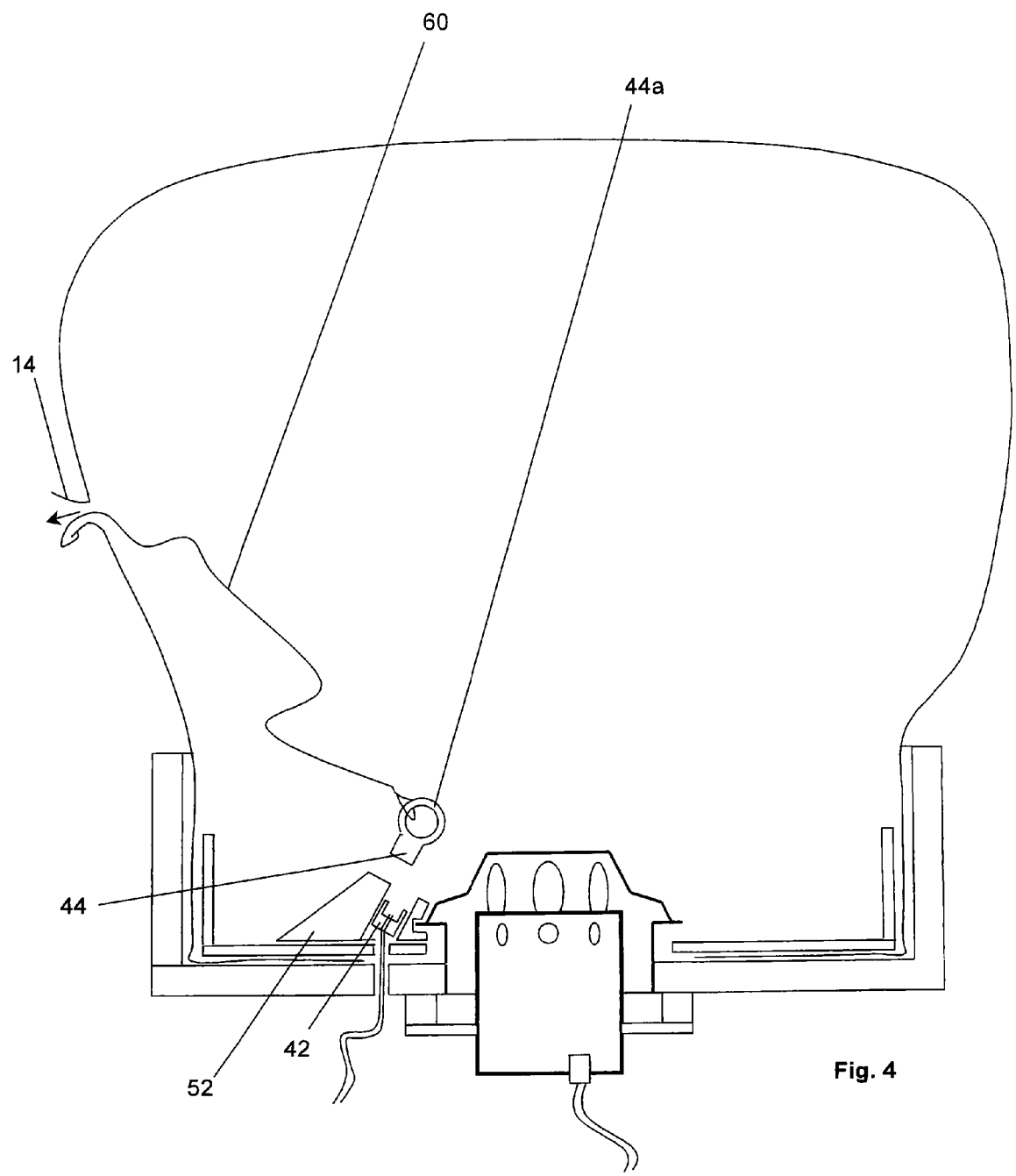
FIG. 4 shows the unit shown in FIG. 3 after actuating the holding device by means of an electrical signal, FIG. 5 show a variation of the first exemplary embodiment in a view similar to the drawing of FIG. 4.

If, as shown in FIG. 4, not only the gas generator 40 but also the second squib 48 are actuated, which can occur simultaneously or staggered in time relative to one another, the second section 44 will be split off the first section 42 of the holding device 40, so that this second section 44 no longer is fixedly connected to the housing 20. The tensioning strap 60 thus is no longer under tension, the nozzle turns outward, and the ventilation system 11 is open, so that the gas can flow out through the ventilation opening 12.

Figure 5:
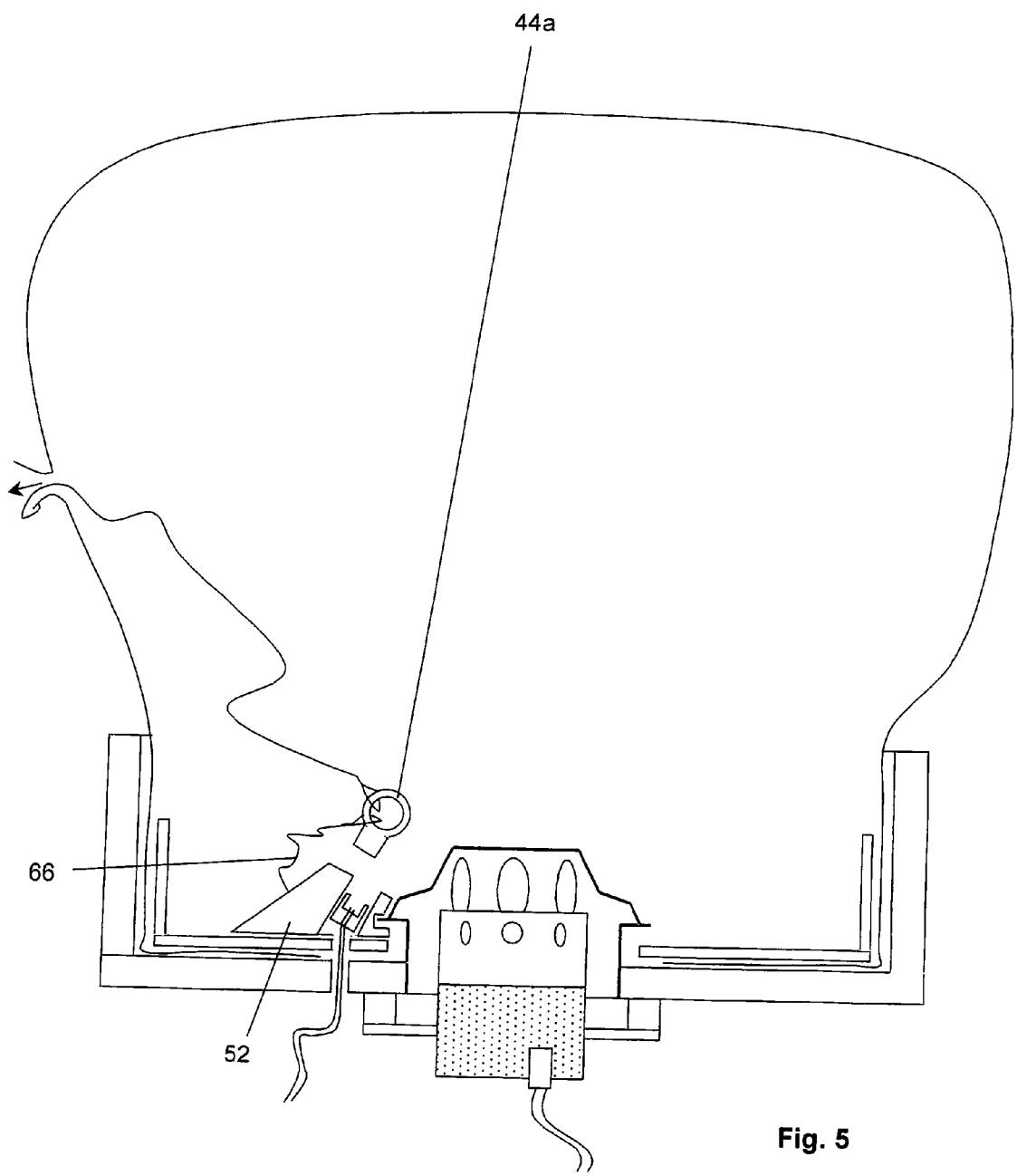

If no additional measures are taken, the second section 44 of the holding device 40 will essentially move freely inside the gas compartment formed by the airbag 10. Should this be prevented, a holding strap 66 can be provided, one of whose ends is connected to the holding ring 44a and its second end is connected to a component which is firmly connected to the housing. By way of example, it can be the casing 52 (FIG. 5).

Figure 6:
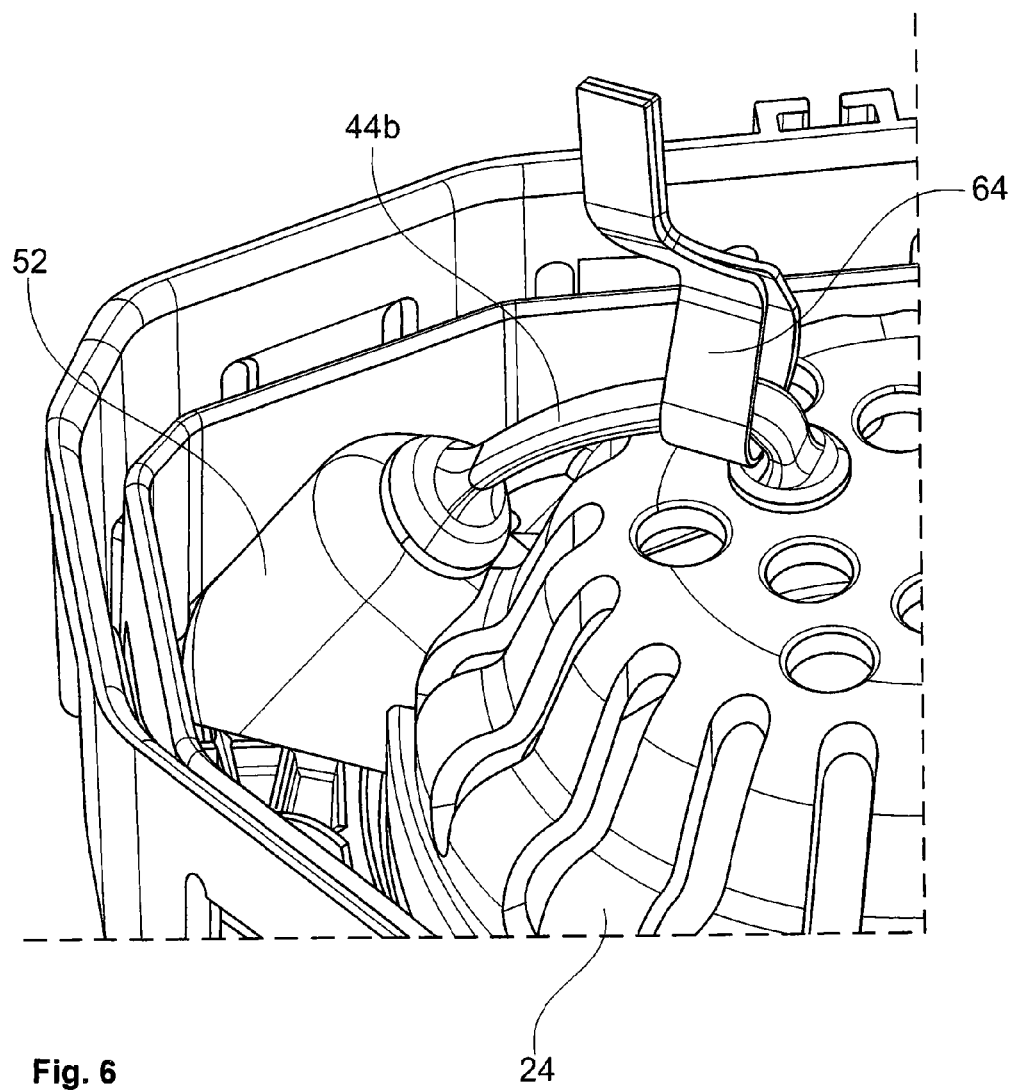
FIG. 6 illustrates a second exemplary embodiment of the invention similar to FIG. 2.

FIG. 6 shows an exemplary embodiment, in which the second section 44 of the holding device 40 cannot come loose at all. For this, a part of the second section 44 is configured as a bracket 44b, whose end facing away from the first section 42 is connected to the diffuser 24 and also stays connected after the ignition of the second squib 48, so that the second section 44 of the holding device cannot come loose from the diffuser 24. The bracket 44b is, in this case, made of a material that is flexible to a certain degree. By way of example, the bracket 44b can be a sheet metal strip.

The tensioning strap 60 can, obviously, also be used as a catch strap in other applications. For example, tensioning strap 60 may operate a venting system different in type than that shown. Also, tensioning strap 60 could be provided to influence the shape of the airbag during its deployment. The features of the invention may be used in many applications in which it is desired to provide a releasable strap in an airbag.

While the above description constitutes the preferred embodiment of the present invention, it will be appreciated that the invention is susceptible to modification, variation and change without departing from the proper scope and fair meaning of the accompanying claims.

The invention claimed is:

1. An airbag unit comprising
    an airbag enclosing a gas compartment,
    an inflator unit for filling the airbag,
    a housing in which the airbag is folded in an undeployed state, the housing including a housing bottom,
    a holding device having a first and a second section, wherein the first section is connected to the housing, and wherein the second section is detachable or separable from the first section upon receipt of an electrical signal,
    a tensioning element having a first and a second end, the first end connected to the airbag, and the second end connected to the housing by the holding device as long as the second section of the holding device is connected to the first section of the holding device, the tensioning element being released if the second section is separated from the first section, and
    one of a holding element and a holding and deflector element,
    wherein the second section of the holding device is arranged inside the airbag and that a hole is provided in the airbag, through which at least one of an ignition lead socket, an ignition cable, and the first section of the holding device protrude,
    wherein further a section of the airbag is held between the housing bottom and one of the holding element or holding and deflector element, and the inflator unit, and
    wherein the holding device is fastened to the holding element or the holding and deflector element.

2. The airbag unit according to claim 1 wherein the holding device has a pyrotechnic squib.

3. The airbag unit according to claim 1 wherein the holding device is entirely located inside the gas compartment of the airbag.

4. The airbag unit according to claim 1 wherein the holding device is at least in part held in a casing.

5. The airbag unit according to claim 4 wherein the casing is located within the gas compartment of the airbag.

6. The airbag unit according to claim 1 wherein the second section of the holding device has a holding ring.

7. The airbag unit according to claim 6 wherein the holding ring is connected to a first end of a further tensioning element in the form of a holding strap and a second end of the further tensioning element is fixedly coupled with the housing.

8. The airbag unit according to claim 1 wherein the tensioning element first end is connected to a ventilation valve of the airbag.

9. The airbag unit according to claim 8 wherein the tensioning first end applies tension to close the valve when the holding device first and second sections remain connected, and the tensioning element first end does not apply tension to the valve wherein the valve remains open to ventilate the airbag when the second section is detached from the first section.

10. An airbag unit comprising
    an airbag enclosing a gas compartment,
    an inflator unit for filling the airbag,
    a housing in which the airbag is folded in an undeployed state, the housing including a housing bottom,
    a holding device having a first and a second section, wherein the first section is connected to the housing, and wherein the second section is detachable or separable from the first section upon receipt of an electrical signal,
    a tensioning element having a first and a second end, the first end connected to the airbag, and the second end connected to the housing by the holding device as long as the second section of the holding device is connected to the first section of the holding device, the tensioning element being released if the second section is separated from the first section, and
    one of a holding element with a bottom and a holding and deflector element with a bottom,
    wherein the second section of the holding device is arranged inside the airbag and a hole is provided in the airbag, through which at least one of an ignition lead socket, an ignition cable, and the first section of the holding device protrude,
    wherein further a section of the airbag is held between the housing bottom and one of the holding element or holding and deflector element, and the inflator unit, and
    wherein the bottom of the holding element or of the holding and deflector element has a first perforation, wherein the housing bottom has a second perforation, and wherein both the first and the second perforations and the hole in the airbag align with one another.

11. The airbag unit according to claim 10 wherein the ignition cable passes through the hole, the first perforation, and the second perforation.

12. An airbag unit according to claim 10, wherein the holding device is entirely located inside the gas compartment of the airbag.

13. An airbag unit according to claim 10, wherein the second section of the holding device has a holding ring.

14. An airbag unit comprising:
    an airbag enclosing a gas compartment,
    an inflator unit for filling the airbag,
    a housing in which the airbag is folded in an undeployed state, the housing including a housing bottom,
    a holding device having a first and a second section, wherein the first section is connected to the housing, and wherein the second section is detachable or separable from the first section upon receipt of an electrical signal,
    a tensioning element having a first and a second end, the first end connected to the airbag, and the second end connected to the housing by the holding device as lonq as the second section of the holding device is connected to the first section of the holding device, the tensioning element being released if the second section is separated from the first section, and
    one of a holding element with a bottom and a holding and deflector element with a bottom,
    wherein the second section of the holding device is arranged inside the airbag and a hole is provided in the airbag, through which at least one of an ignition lead socket, an ignition cable, and the first section of the holding device protrude,
    wherein the holding device has a pyrotechnic squib and is at least in part held in a casing and wherein the squib is protected from hot gases emitted by the inflator unit by the casing.

15. The airbag unit according to claim 14, further comprising in that a section of the airbag is held between a bottom of a holding element, or of a holding and deflector element or the inflator unit, and the housing bottom formed by the housing.

16. The airbag unit according to claim 14, further comprising in that the holding device is fastened to the holding element or to the holding and deflector element.

17. An airbag unit comprising an airbag enclosing a gas compartment, an inflator unit for filling the airbag, a housing in which the airbag is folded in an undeployed state, the housing including a housing bottom, a holding device having a first and a second section, wherein the first section is connected to the housing, and wherein the second section is detachable or separable from the first section upon receipt of an electrical signal, and a tensioning element having a first and a second end, the first end connected to the airbag, and the second end connected to the housing by the holding device as long as the second section of the holding device is connected to the first section of the holding device, the tensioning element being released if the second section is separated from the first section, wherein the second section of the holding device is arranged inside the airbag and a hole is provided in the airbag, through which at least one of an ignition lead socket, an ignition cable, and the first section of the holding device protrude, wherein the second section of the holding device has a bracket with an end facing away from the first section and fixedly connected to the housing.

18. The airbag unit according to claim 17, wherein the bracket is connected to a diffuser.

19. An airbag unit according to claim 17, wherein the holding device is entirely located inside the gas compartment of the airbag.

20. An airbag unit according to claim 17, wherein the second section of the holding device has a holding ring.

* * * * *